July 30, 1935.    E. J. RAY    2,009,563
MACHINE FOR USE IN THE MANUFACTURE OF SHOES
Filed March 26, 1932    6 Sheets-Sheet 5

Witness
F. A. Wright

Inventor
Eugene J. Ray
by Van Everen Fish
Hildreth Neary Attys.

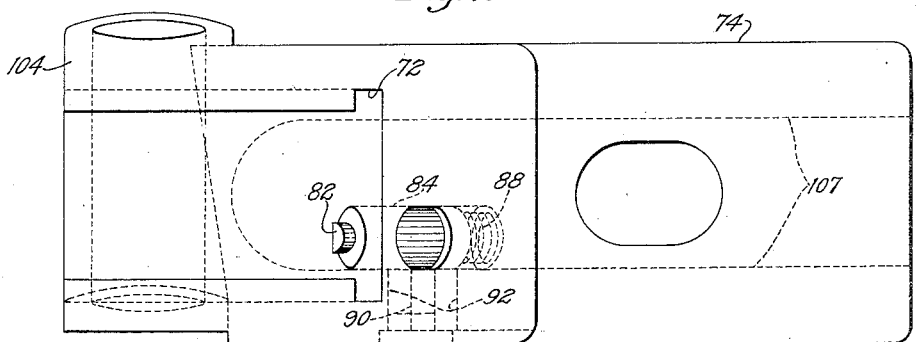
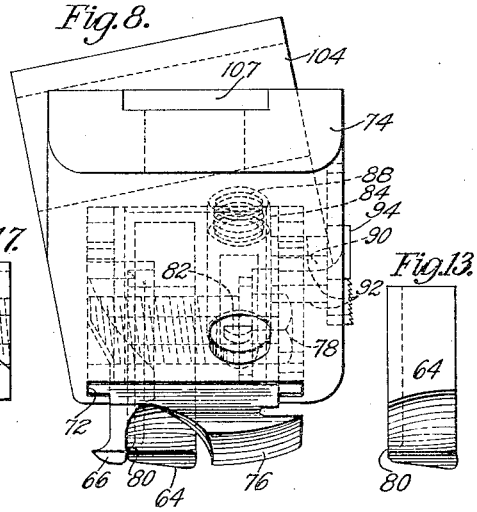
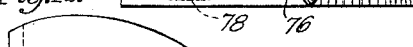
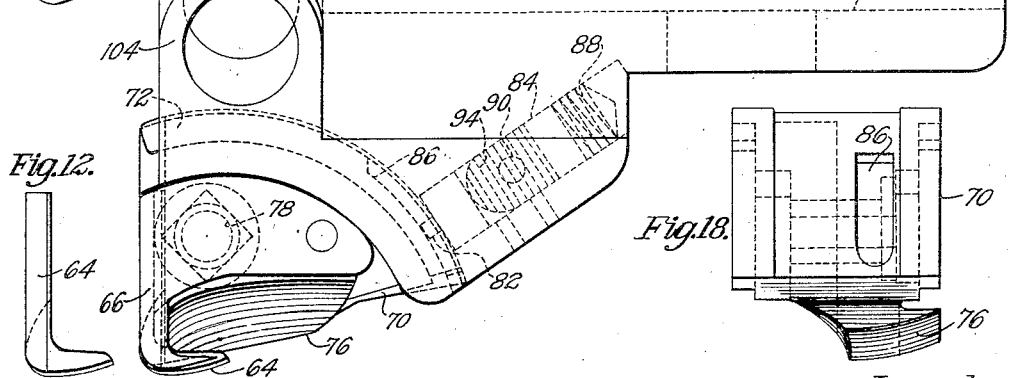
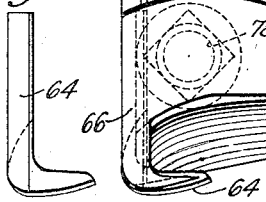
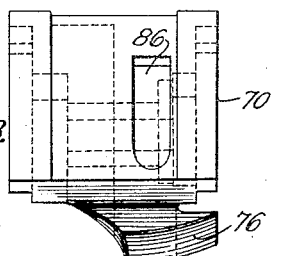

Patented July 30, 1935

2,009,563

UNITED STATES PATENT OFFICE 2,009,563

MACHINE FOR USE IN THE MANUFACTURE OF SHOES

Eugene J. Ray, Beverly, Mass., assignor to United Shoe Machinery Corporation, Paterson, N. J., a corporation of New Jersey Application March 26, 1932, Serial No. 601,422

30 Claims. (Cl. 12—17)

The present invention relates to automatic shoe machines, and is herein disclosed as applied more particularly to a machine for use in channeling an outsole which has been temporarily secured in its proper position on a last preparatory to permanently sewing or otherwise fastening the outsole to the shoe, although it is to be understood that the various features of the invention are not limited to this specific type of machine, but may be applied equally well to machines of other descriptions which are arranged to perform channeling or lip turning operations.

It is a primary object of the present invention to provide a fully automatic channeling and lip turning mechanism of the so-called "iron man" type in which the shoe is supported on a jack and is automatically presented and fed to the shoe operating devices to transfer the point of operation about the shoe, and which will be comparatively simple in construction, and will operate certainly, efficiently, and in a satisfactory manner to perform the complete operation on a shoe sole without requiring the attention of the operator except to insert and remove shoes from the machine.

It is also an object of the present invention to provide novel and improved channeling and lip turning mechanisms which, while particularly adapted for use in a fully automatic machine of the class described, are also well adapted for use in connection with channeling machines of other descriptions to improve the quality of the work produced and the ease of operation of the machine.

Figure 1:
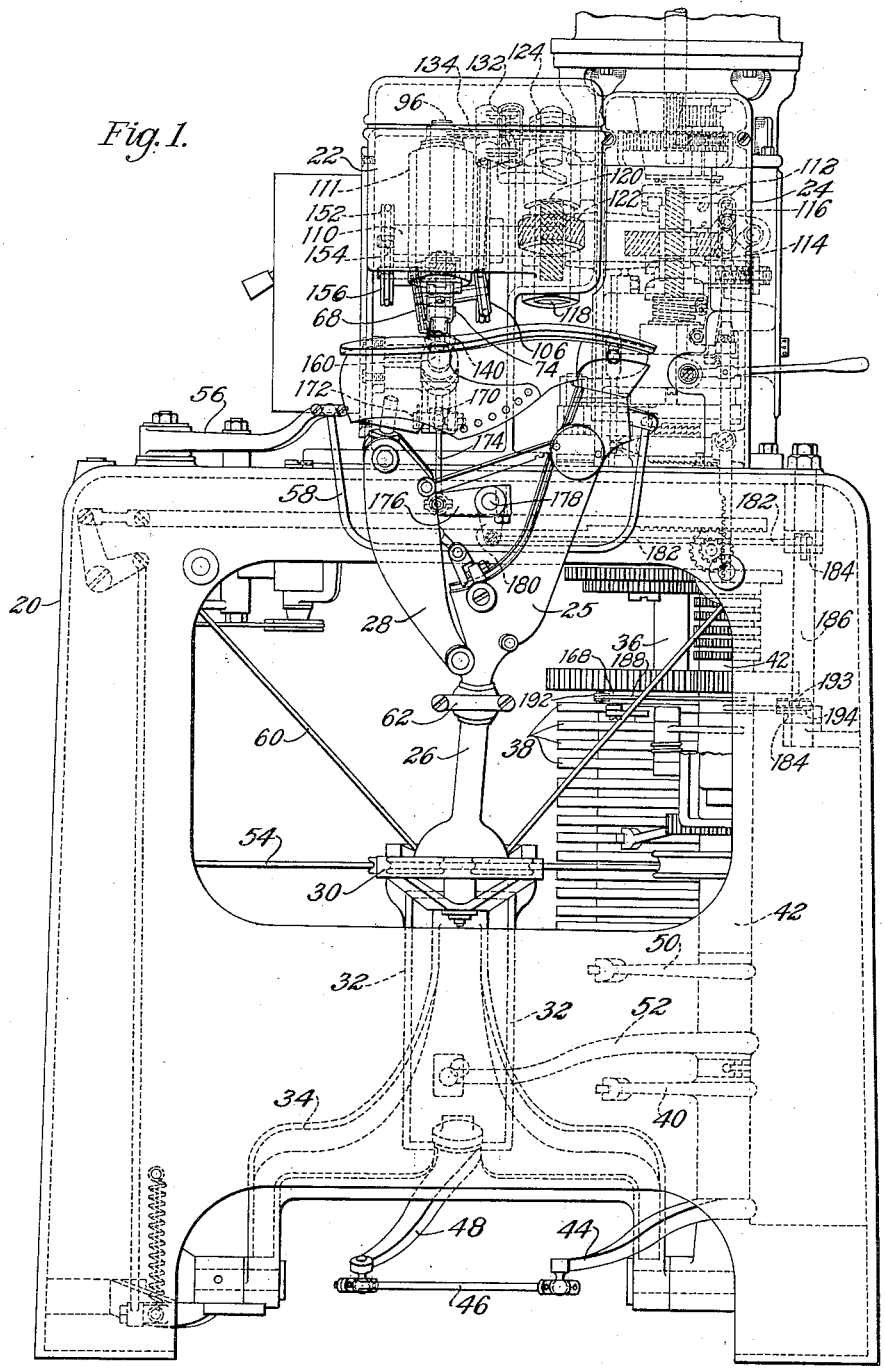
Figure 2:
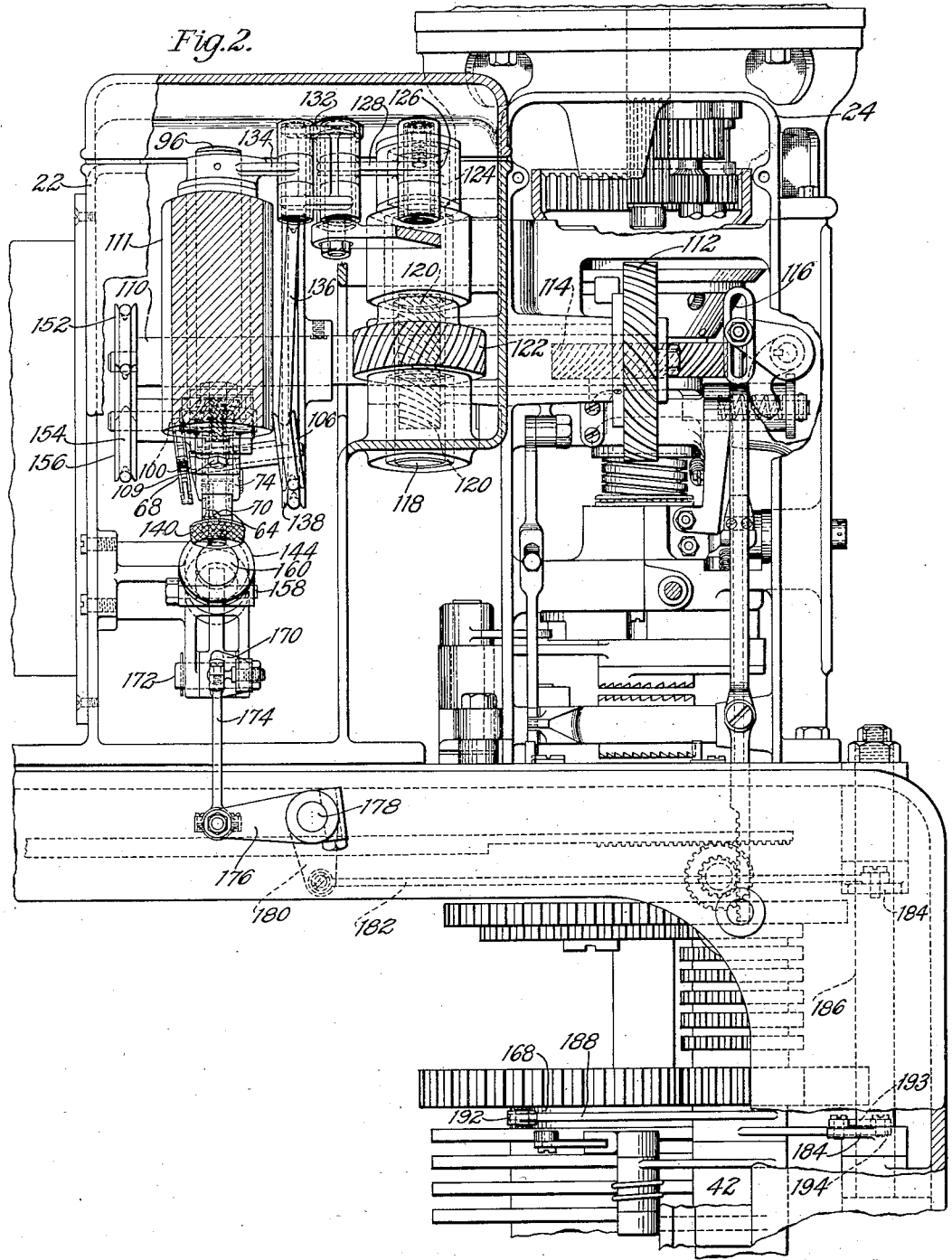
Figure 3:
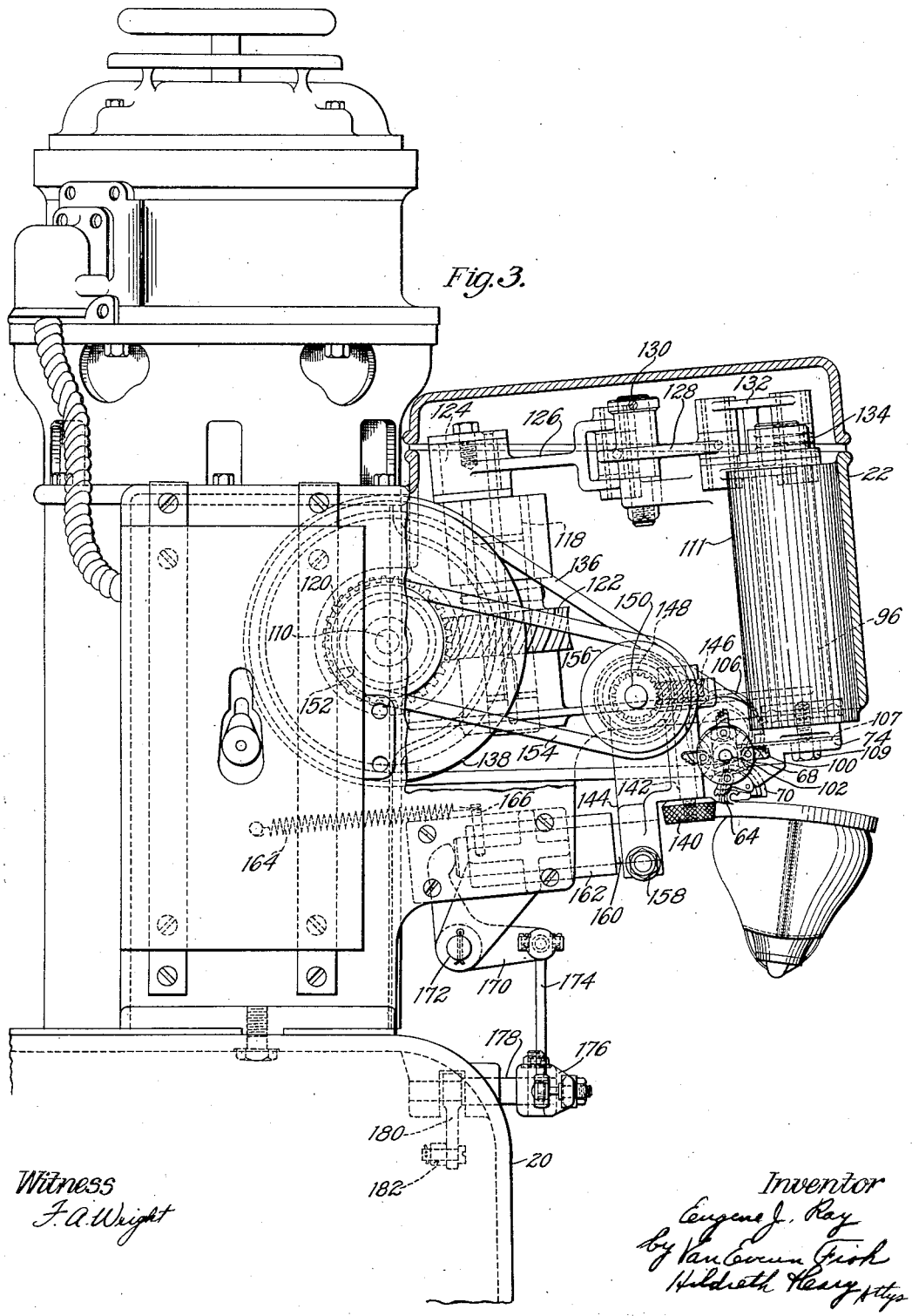
Figure 4:
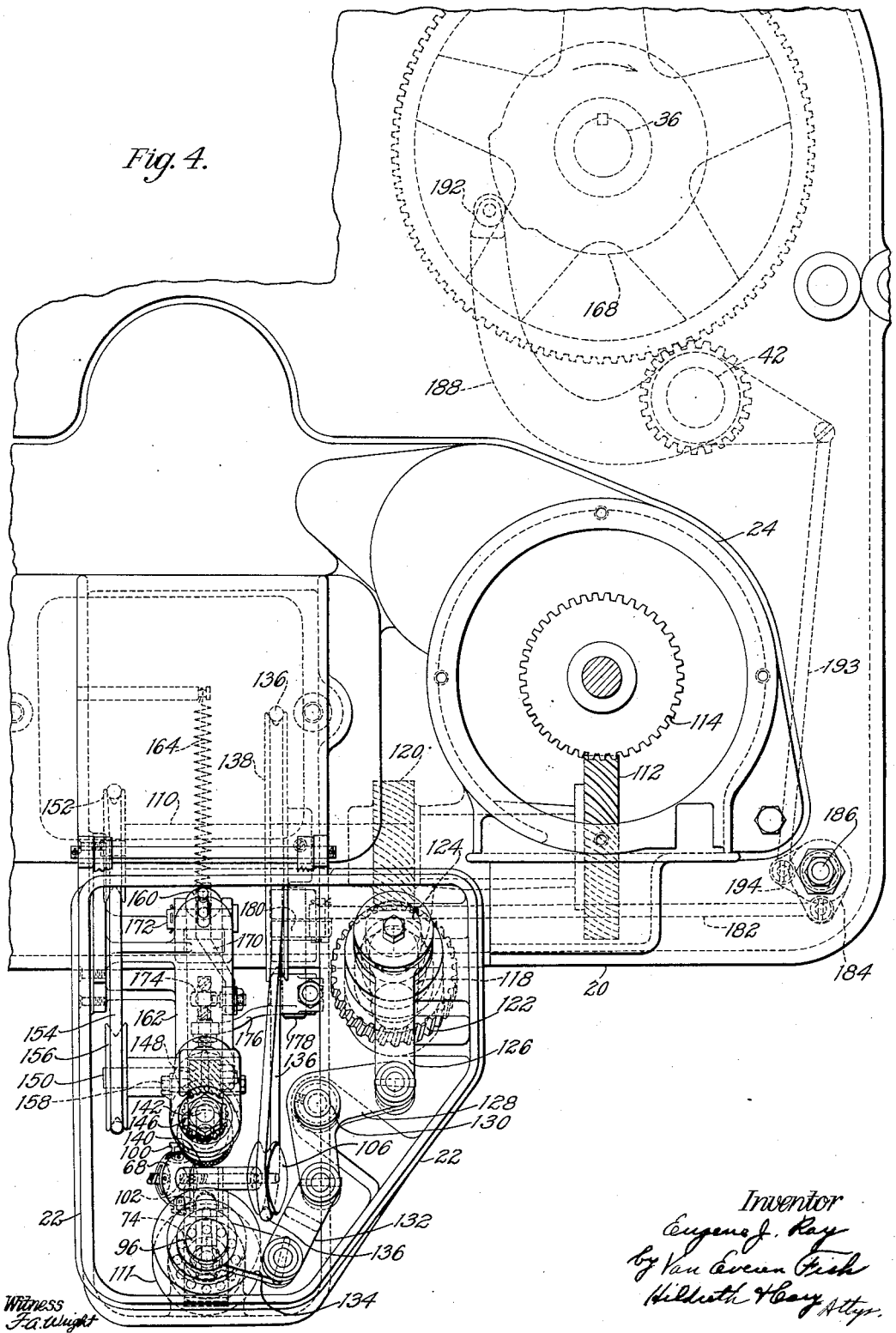
Figure 5:
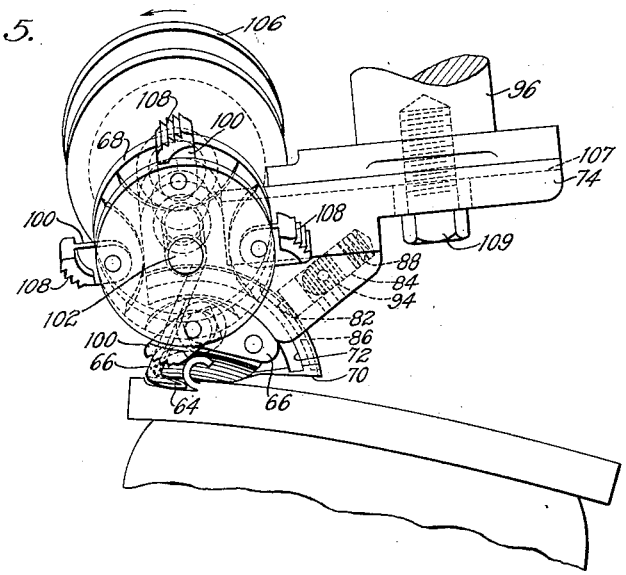
Figure 6:
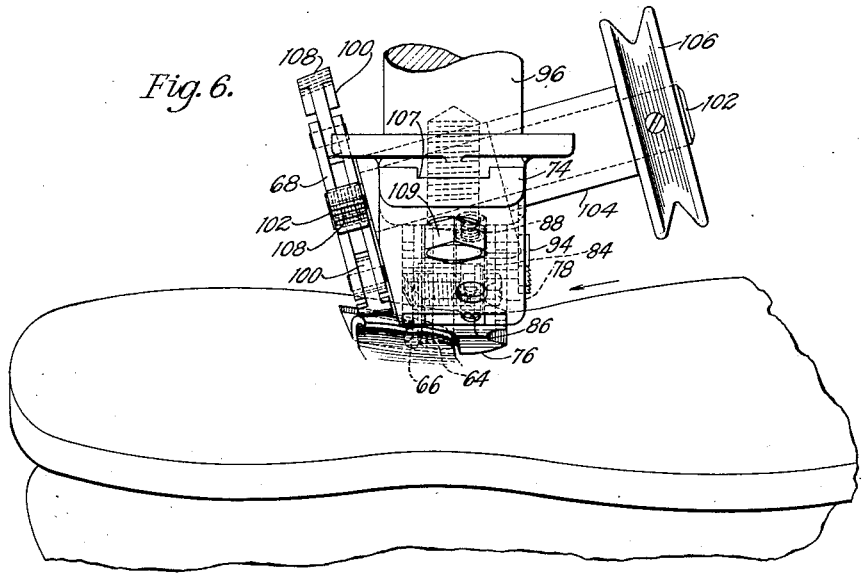

With these and other objects in view as may hereinafter appear, the several features of the invention consist in the devices, combinations and arrangement of parts hereinafter described and claimed, which together with the advantages to be obtained thereby, should be readily understood by one skilled in the art from the following description taken in connection with the accompanying drawings, in which Fig. 1 is a view in front elevation of the machine with a shoe in position on the jack at the start of the channeling operation; Fig. 2 is a view in front elevation on an enlarged scale of portions of the machine shown in Fig. 1, with the jack and portions of the casing removed to illustrate particularly the operating mechanisms for the channeling and lip turning devices; Fig. 3 is a view in left side elevation of the head of the machine with a portion of the casing removed to show underlying parts; Fig. 4 is a plan view of the machine with the motor and the top plate for the head removed to illustrate substantially the parts shown in Fig. 2; Fig. 5 is a detail view in left side elevation of the channeling and lip turning devices; Fig. 6 is a view of the parts shown in Fig. 5 looking from the right; Fig. 7 is a plan view of the oscillating carrier arm for the channeling and lip turning devices looking from beneath with the carrier block removed; Fig. 8 is an end view of the carrier arm shown in Fig. 9 looking from the right with the carrier block in position to illustrate particularly the channeling knife, plow and depth gauge supported thereon; Fig. 9 is a view of the parts shown in Fig. 8 looking from the left; Fig. 10 is a plan view looking from beneath, of the carrier block and parts mounted thereon as shown in Figs. 8 and 9; Fig. 11 is a plan view looking from beneath, of the channeling knife shown in Fig. 10; Fig. 12 is a side view of the knife as shown in Fig. 9; Fig. 13 is a view in front elevation of the knife as shown in Fig. 8; Fig. 14 is a detail sectional view taken on lines 14 of Fig. 11; Fig. 15 is a plan view of the plow looking from beneath, as shown in Fig. 10; Fig. 16 is a view of the plow in side elevation as shown in Fig. 9; Fig. 17 is a view of the plow in front elevation as shown in Fig. 8; and Fig. 18 is a view illustrating particularly the carrier and depth gauge for the channel knife and plow as shown in Fig. 8.

The machine herein disclosed as embodying in a preferred form the several features of the present invention, comprises channeling and lip turning devices including a channel knife arranged to reciprocate in the line of feed, a plow, and a rotary lip turning tool supported to reciprocate with the knife, a jack arranged to support a lasted shoe consisting of an upper and insole stretched over a last and an outsole temporarily cemented or otherwise secured thereto, and automatic mechanism for imparting tipping, turning, positioning and feeding movements to the jack to position the shoe with relation to the shoe operating devices and to transfer the point of operation about the shoe.

In the present construction the shoe is entirely supported by the jack and the automatic actuating mechanism therefor, which acts to force the shoe upwardly into contact with a depth gage mounted to reciprocate with the knife in the line of feed, and rearwardly to maintain the edge of the shoe sole in engagement with a feed roll which is arranged to determine the position of the channel on the shoe, and is positively rotated to supplement the operation of the jack actuating mechanism to feed the shoe continuously and evenly against the shocks imparted to the shoe by the action of the rapidly reciprocating knife and the lip turning tool.

The channeling and lip turning devices herein disclosed are particularly adapted for use with the automatic jack above described, being arranged to provide a minimum of resistance to the proper positioning and feeding of the shoe by the jack actuating mechanism. To this end the channel knife is arranged to reciprocate at a comparatively rapid rate in the line of feed, and is mounted to oscillate in a plane parallel to the shoe sole about an axis located toward the center line of the shoe sole from the point of operation of the knife, so that the line of movement of the knife tends to conform to the curve of the shoe sole and facilitates the turning movements of the shoe, particularly while channeling around the toe portion of the shoe. To further insure favorable working conditions during the operation on the shoe, the lip turning devices are mounted on the same support to reciprocate with the knife, and comprise a plow and a rotary lip turning tool which is arranged to turn the channel lip regardless of the exact position of the shoe sole and without adding appreciably to the pressure required to maintain the shoe in its proper operating position.

Referring more specifically to the drawings, the base of the machine is indicated at 20, the head or frame for supporting the channeling and lip turning devices is indicated at 22, and the casing or frame within which the stop motion is housed is indicated at 24. The shoe supporting jack, as shown in Fig. 1, comprises the toe supporting arm 25 rigid with the hollow spindle 26, and a heel supporting arm 28 mounted at its lower end upon the upper end of the spindle 26, these parts being carried by a jack supporting structure which comprises an arm 30 on the forward end of which the lower end of the jack spindle 26 is rotatably mounted by means of a gimbal joint, a support 32 on which the arm 30 is mounted to swing vertically, and a frame 34 pivotally mounted at its lower end in the machine base so as to be capable of swinging about a horizontal axis and upon which the support 32 is mounted so as to swing about a substantially vertical axis.

For imparting the required tipping, turning and feeding movements to the jack, a pattern cam shaft 36 is mounted in the machine base carrying a series of cams 38 which act through connections including a number of cam actuated levers to control the movements of the jack. The required longitudinal tipping movements are imparted to the jack from a cam actuated lever 40 which is sleeved on a vertical shaft 42, and is arranged to turn the support 32 about its pivot through connections which include an arm 44 formed integrally with the cam lever 40, a connecting link 46, and an arm 48 rigidly secured to the lower end of the support 32. The lateral tipping movements of the shoe are similarly controlled by means of a cam lever 50 loosely sleeved on the shaft 42 and provided with an arm 52 connected to move the frame 34 forwardly and back about its pivot. Turning movements are imparted to the jack by means of a cable 54 which is actuated to turn the jack through connections from one of the cams 38. The shoe is fed by a feed lever 56 which is actuated from a cam on the pattern cam shaft 36 and controls the longitudinal position of the shoe in the machine. The feed lever is pivotally mounted at its rear end in the top plate of the machine base so as to swing in a horizontal plane, and is connected at its forward end by means of a link 58 to the toe supporting arm 25 of the jack. The arm 30 on which the jack is mounted, is supported in a substantially horizontal position by means of a cable 60 which is tensioned by means of a weight to offset the weight of the jack and shoe supported thereon, and tends to force the shoe upwardly with a firm pressure against the shoe operating devices. The jack is also supported by means of a bar 62 which is connected at its forward end by means of a universal joint to the hollow spindle 26, and is controlled by mechanism, not shown, normally to hold the upper end of the jack and shoe inwardly against the shoe operating devices, and upon completion of the operation on the shoe, to move the jack outwardly to inoperative position. These mechanisms for supporting and for imparting the required tipping, turning and feeding movements to the jack are similar in design and in their mode of operation to those disclosed in the patent to Topham and Morrill, No. 1,616,714, dated February 3, 1927, and need not be further described.

The stop motion of the machine is arranged to stop the work operating devices at the end of an operation on a shoe, and to control the operation of the pattern cam shaft and the devices for supporting and actuating the jack to return the jack to its starting position while operating at the same time to move the jack positively away from the shoe operating devices and to open the jack to release the shoe. This mechanism is well known in the art, and is adequately described in the Patent No. 1,616,714.

The channeling and lip turning devices of the present machine comprise a channel knife 64 arranged to reciprocate in the line of feed, a plow 66, and a rotary lip turning tool generally indicated at 68. The channeling knife is mounted on a carrier block 70 which is mounted to slide in an arcuate guideway 72 formed on a reciprocating carrier arm 74, to permit the block and the parts mounted thereon to be freely adjusted laterally of the line of feed about an axis located substantially at the tip of the cutter blade 64. A depth gauge or rest 76 formed on the block 70 is arranged to engage with the face of the shoe sole immediately in advance of the knife and for an appreciable distance laterally of the line of feed, so that the block and the operating parts secured thereto are positioned accurately with relation to the shoe sole irrespective of the angle at which it is held in the machine. The plow 66 is mounted on the block adjacent to and immediately following the knife in the line of feed to raise and partially turn the channel lip for engagement by the lip turning tool, and serves also as a clamp to hold the knife rigidly in position. A clamping screw 78 is provided to clamp the plow 66 and the knife 64 rigidly in position in the block 70. In order to raise the lip so that it will be engaged by and effectively positioned by the plow in the path of the lip turning tool, the upper side of the knife is provided at its rear end with a raised portion 80 to slightly lift the lip.

The movement of the carrier block 70 in the guideway 72 is limited by the engagement of a detent pin 82, slidably mounted in a recess 84 in the supporting arm 74, with a corresponding slot 86 in the carrier block 70, the pin being normally held in engaging position by means of a compression spring 88 mounted in the recess back of the pin. A laterally extending member 90 secured to the detent pin 82 and arranged to slide therewith in a slot 92 in the supporting arm 74, has on its outer end a roughened surface 94 to enable the operator to move the detent pin 82 against the pressure of the spring 88 out of engagement with the slot 86 to permit the carrier block 70 to be readily removed from the machine.

In the machine herein disclosed, the channel lip is turned and beaten down in its reverse position by means of the rotary lip turning tool 68 (see Figs. 5 and 6) which is arranged to rotate in a plane transverse and substantially perpendicular to the channel cut and is mounted on the supporting arm 74 to oscillate with the knife in the line of feed. This tool comprises a series of blades 100 which are pivotally mounted at spaced intervals between two disks or flanges 68 carried by a hub mounted on one end of a stub shaft 102 which is journaled in a bearing 104 on the supporting arm 74, and is provided at its other end with a driving pulley 106, through which the tool is continuously driven during the operation of the machine. During the operation of the rotary lip turning tool, the blades 100 are maintained yieldingly in a radial position by centrifugal force to successively engage with the lip partially raised as above pointed out by the action of the knife 64 and plow 66, causing it to be turned over and flattened in a reverse position. Each of the blades is provided with a sloping surface 108 which is roughened to engage with and exert a drawing action on the lip as the blade is yieldingly dragged across the upturned edge of the lip. As the lip is turned over by the action of successive blades, it will be noted that the blades, being held in a radial position, tend to strike near the base of the lip, sharply bending it back at this point to insure its being fully drawn back out of the way, so that the channel is entirely open for the succeeding stitching or fastening operation.

The carrier arm 74 on which the reciprocating channeling and lip turning devices are mounted, is pivoted to oscillate in a plane parallel to the shoe sole about an axis located towards the center line of the shoe sole from the point of operation of the knife. This pivot comprises a vertical rock shaft 96 which is provided at its lower end with a tongue to engage a corresponding slot 107 in the carrier arm and is adjustably secured thereto to permit an adjustment of the effective length of the member 74 by means of a clamping screw 109. The rock shaft 96 is mounted to rotate in a bearing 111 formed on a forwardly projecting or overhanging portion of the frame 22. With this construction and arrangement of the mechanism for reciprocating the channeling and lip turning devices in a plane parallel to the shoe sole, the shoe is maintained at the point of operation at all times in one position vertically against the upward pressure of the jack to insure a smooth and efficient cooperation of the channeling and lip turning devices with the actuating mechanisms for tipping, turning and feeding the jack. It will also be noted that the reciprocatory movements of the knife and plow follow a slightly arcuate path which tends to conform to the curves of the shoe, and results in particularly favorable operating conditions for the turning and feeding movements of the jack, particularly in rounding the toe portion of the shoe.

The channeling and lip turning devices are driven from the driving and stopping mechanism of the machine through a horizontal drive shaft 110 which is provided at one end with a spur gear 112 arranged to mesh with a driving gear 114 formed on the clutch sleeve 116 which forms a part of the stop motion of the machine. A rapid oscillatory movement is imparted to the supporting arm 74 for the channel knife and the vertical stud or shaft 96 from the horizontal shaft 110 through connections which comprise a vertical drive shaft 118 positively driven from the drive shaft 110 by the engagement of the gear 120 on the drive shaft 110 and the gear 122 on the vertical shaft 118. At its upper end the shaft 118 is connected by an eccentric pivot 124 to one end of a connecting link 126, which at its other end is secured to one arm of a bell-crank lever 128 pivoted at 130 on the fixed head 22. The free arm of the bell-crank 128 is connected through a link 132 to an arm 134 secured to the upper end of the rock shaft 96. The link 132 and the connecting arm of the bell-crank 128 form respectively the two links of a toggle connection which is actuated from the eccentric 124 of the vertical drive shaft 118 to move the middle connection of the toggle past the center in each direction to secure two vibrations of the arm 134 and rock shaft 96 for each rotation of the vertical drive shaft 118, thus securing a rapid vibration of the cutter. The lip turning tool is continuously rotated from the horizontal drive shaft 110 by means of a belt 136 which passes around the pulley 106 and around a pulley 138 secured to the drive shaft 110.

The shoe is positioned laterally with relation to the channeling and lip turning devices by means of a feed roll 140 which is arranged to engage with the edge of the shoe sole, and is positively driven at a linear rate somewhat greater than the feeding movements imparted to the shoe by the jack actuating mechanism above described, in order to take up any lag in the operation of the jack feed. The feed roll 140 is formed on the lower end of a vertically arranged shaft 142, which is journalled in a bracket 144 and at its upper end carries a gear 146 arranged to mesh with a gear 148 on a horizontal shaft 150 carried by the bracket 144. A driving pulley 152 on the drive shaft 110 is connected through a belt 154 to a corresponding pulley 156 on the shaft 150 to continuously rotate the feed roll 140.

In order to secure a comparatively wide margin between the channel and the edge of the shoe sole along the shank and a relatively narrow margin around the forepart of the shoe, the feed roll 140 and bracket 144 on which it is supported are arranged for lateral movements toward and away from the channel knife in timed relation to the feeding movements imparted to the shoe. The bracket 144 is clamped by means of a clamping screw 158 to the forward end of a slide 160 supported in a guideway 162 in the head 22. A tension spring 164 connected at one end to the frame 22 and at its other end to a pin 166 on the slide 160, tends to move the slide 160 and feed roll 140 to a retracted position. The slide 160 is positioned and is advanced against the pressure of the spring 164 to determine the width of the margin between the channeling knife and the edge of the sole during the channeling operation through connections controlled by a pattern cam 168 (Fig. 4) mounted on the pattern cam shaft 36. These connections, as best shown in Figs. 2, 3 and 4, comprise a bell-crank lever 170, pivotally mounted at 172 on a bracket forming a part of the frame 22, having a vertical arm engaging with the rear end of the slide 160 and a horizontally extending arm which is connected through a link 174 to an arm 176 secured to a short rock shaft 178 journaled in the base of the machine. A downwardly extending arm 180 on the rock shaft 178 is connected by means of a laterally extending link 182 to an arm 184 on a vertical rock shaft 186. The position of the rock shaft 186 is controlled through the above stated connections from the cam 168 (see Fig. 4) by means of a cam lever 188 which is loosely sleeved to turn on the vertical shaft 42, and carries at one end a roll 192 arranged to engage with the cam 168, and is also connected by a link 193 to an arm 194 on the rock shaft 186.

With the parts in the starting position shown in Fig. 4, and the channeling mechanism about to begin the channeling operation at the shank portion of the shoe, the roll 192 rests on the high portion of the cam 168, causing the slide 160 and feed roll 140 to occupy a relatively retracted position with relation to the channeling knife, so that a comparatively wide margin is provided during the progress of the channeling operation along the shank portion of the shoe. As the roll 192 rides onto the low portion of the cam 168, the bellcrank lever 170 is rocked by the connections above described to advance the slide 160 and feed roll 140, so that a comparatively narrow margin is produced during the channeling of the sole and toe portions of the shoe. After the channeling and lip turning operation has progressed around the sole portion of the shoe, the roll 192 again rides onto the high portion of the cam, causing the bellcrank lever 170 to be rotated to retract the slide 160 and feed roll 140 to provide a comparatively wide margin between the channel and the edge of the shoe sole as the operation is completed along the shank portion of the sole.

The nature and scope of the invention having been indicated and a machine embodying the several features of the invention having been specifically described, what is claimed is:

1. A machine of the class described having, in combination, means for guiding a shoe sole, a rotary lip turning tool comprising a hub arranged to rotate in a plane transversely of and substantially perpendicular to the channel lip, a lip turning blade permanently pivotally connected at one end to the hub and maintained yieldingly extended in a radial position by centrifugal force and arranged with relation to the sole guiding means to engage the lip near the base thereof, and having a drawing action to fully turn the lip and means for rotating the tool in a direction to turn the lip.

2. A machine of the class described having, in combination, means for guiding a shoe sole, a rotary lip turning tool comprising a hub arranged to rotate in a plane transversely of and substantially perpendicular to the channel lip, a lip turning blade permanently pivotally secured at one end to the hub and maintained yieldingly in a radial position by centrifugal force, the lip engaging surface of said blade being shaped and arranged with relation to the sole guiding means to engage with and beat over the lip near the base thereof and to permit a drawing action to fully turn the lip and means for rotating the tool in a direction to turn the lip.

3. A machine of the class described having, in combination, means for guiding a shoe sole, a rotary lip turning tool comprising a hub arranged to rotate in a plane transversely of and substantially perpendicular to the lip channel, a lip turning blade pivotally connected to the hub and maintained yieldingly in a radial position by centrifugal force, said blade being shaped to engage with the lip near the base thereof and having a roughened surface to provide a drawing action to fully turn the lip and means for rotating the tool in a direction to turn the lip.

4. A machine of the class described having, in combination, means for guiding a shoe sole, a rotary lip turning tool comprising a hub arranged to rotate in a plane transversely of and substantially perpendicular to the lip channel, a plurality of lip turning blades permanently pivotally connected at one end to the hub and maintained yieldingly in a radial position by centrifugal force and arranged with relation to the sole guiding means to successively engage with the lip near the base thereof to beat over the lip and having a drawing action to fully turn the lip and means for rotating the tool in a direction to turn the lip.

5. A channeling machine having, in combination, a cutter member arranged to form a channel in a shoe sole, means for guiding and feeding the sole relatively to the cutter, and a rotatable lip turning tool comprising a rotatable hub and a series of blades pivotally connected thereto and held yieldingly in radial position by centrifugal force to engage with and turn over the channel lip.

6. A channeling machine having, in combination, means for guiding and feeding a shoe sole, a cutter knife arranged to reciprocate in the line of feed for cutting a channel in the sole, and a continuously rotating lip turning tool supported to oscillate with the knife and arranged to engage with and turn over the channel lip.

7. A channeling machine having, in combination, means for guiding and feeding a shoe sole, a cutter knife for forming the channel, an oscillating arm on which the knife is mounted to reciprocate in the line of feed, a rotatable lip turning tool supported on said arm arranged to engage with and turn over the channel lip at a point adjacent to and following the knife in the line of feed, and means for imparting rotary movements to the lip turning tool.

8. A channeling machine having, in combination, means for guiding and feeding a shoe sole, a cutter knife for forming a channel, an oscillating arm on which the knife is mounted to reciprocate in the line of feed, a plow supported on the arm adjacent the knife to turn up the channel lip, and a lip turning tool supported on the arm arranged to engage with and turn over the channel lip at a point immediately adjacent the plow.

9. A channeling machine having, in combination, means for guiding and feeding a shoe sole, a cutter knife for forming a channel, means for oscillating the knife in the line of feed, and a lip turning tool supported to oscillate with the knife in the line of feed and arranged for movement laterally of the channel to engage with and turn over the channel lip at a point adjacent and following the knife.

10. A machine of the class described having, in combination, channeling and lip turning devices comprising a channeling knife, a lip turning tool arranged for movement laterally of the channel to engage with and turn over the channel lip at a point adjacent and following the knife, and means for oscillating the knife and the lip turning tool as a unit in the line of feed.

11. A machine of the class described having, in combination, channeling and lip turning devices comprising a channeling knife, an oscillating arm on which the knife is mounted to reciprocate in the line of feed, and a lip turning tool supported on the arm to reciprocate with the knife and arranged for movement laterally of the channel to engage with and turn over the channel lip.

12. A machine of the class described having, in combination, channeling and lip turning devices comprising a channeling knife, a supporting member for the knife pivoted to oscillate in a plane parallel to the shoe sole about an axis located toward the center line of the shoe sole from the point of operation of the knife, means for imparting an oscillatory movement to the support, and a lip turning tool carried on the support to reciprocate with the knife and arranged for movement laterally of the channel to engage with and turn over the channel lip.

13. A channeling machine having, in combination, means for guiding and feeding a shoe sole, a cutting knife for forming a channel in the sole, a rotatable lip turning tool comprising a hub arranged to rotate transversely of the channel and provided with blades pivoted thereto and maintained in an extended position by centrifugal force to engage with and turn the channel lip.

14. A machine of the class described having, in combination, channeling and lip turning devices comprising a channeling knife arranged to reciprocate in the line of feed, a plow arranged to follow the knife in the line of feed to raise the lip, and a lip turning tool arranged to engage with and turn over the channel lip.

15. A channeling machine having, in combination, means for supporting and feeding a shoe sole, a channeling knife arranged to reciprocate in the line of feed and shaped to partially raise the lip formed by the advancing stroke of the knife, and a plow supported to reciprocate with the knife arranged to cooperate with the knife to still further raise and partially turn the lip edge.

16. A channeling machine having, in combination, means for guiding and feeding a shoe sole, a channeling knife, a support on which the knife is carried pivoted to reciprocate the knife in the line of feed, a bell-crank lever, a link connecting with one arm of the bell-crank and with the pivoted support to form a toggle connection for actuating the support, a drive shaft, and a crank connection with the bell-crank from said drive shaft for oscillating the bell-crank arranged to move the central pivot of the toggle connection past the line of centers to secure a double oscillation of the knife support.

17. A channeling machine having, in combination, means for supporting and feeding a shoe sole, a channeling knife, a support on which the knife is carried pivoted to reciprocate the knife in the line of feed, a toggle connection having one link connected to move said support and the other link connected to a fixed pivot, and means for reciprocating the central pivot of the toggle links past the line of centers to secure a double reciprocation of the knife support.

18. A channeling machine having, in combination, means for guiding and feeding a shoe sole, a channeling knife, a supporting member for the knife pivoted to oscillate in a plane parallel to the shoe sole about an axis located toward the center line of the shoe sole from the point of operation of the knife, and means for imparting a rapid oscillatory movement to the support with relation to the shoe as the shoe is fed past the knife.

19. A channeling machine having, in combination, means for guiding and feeding a shoe sole, a channel knife, a plow arranged to follow the knife in the line of feed, a supporting member for the knife and plow pivoted to oscillate in a plane parallel to the shoe sole about an axis located toward the center line of the shoe sole from the point of operation of the knife, and means for imparting a rapid oscillatory movement to the support.

20. A channeling machine having, in combination, means for guiding and feeding a shoe sole, a plow, and a lip turning tool arranged to follow the knife in the line of feed, a supporting member for the knife, plow and lip turning tool pivoted to oscillate in a plane parallel to the shoe sole about an axis located toward the center line of the shoe sole from the point of operation of the knife, and means for imparting a rapid oscillatory movement to the support.

21. A machine for operating on shoes having, in combination, shoe operating devices including a knife arranged to reciprocate in the line of feed, a plow following the knife in the line of feed, a lip turning tool, a shoe supporting jack, and automatically operating mechanism for imparting tipping, turning and feeding movements to the jack to maintain the shoe in operative position with relation to the channeling and lip turning devices, and to transfer the point of operation about the shoe.

22. A machine for operating on shoes having, in combination, channeling devices including a channel cutting knife arranged to reciprocate in the line of feed, means engaging with the shoe for positioning the shoe at the point of operation with relation to the cutting knife, a shoe supporting jack, and means for imparting tipping, turning and feeding movements to the jack to maintain the shoe in operative position with relation to the knife and to transfer the point of operation about the shoe.

23. A machine for operating on shoes having, in combination, channeling devices including a channel knife, a supporting member for the knife pivoted to oscillate in a plane parallel to the shoe sole about an axis located toward the center line of the shoe sole from the point of operation of the knife, means for imparting an oscillatory movement to the supporting member, a shoe supporting jack, and automatically operating mechanism for imparting tipping, turning and feeding movements to the jack to maintain the shoe in operative position with relation to the channeling and lip turning devices and to transfer the point of operation about the shoe.

24. A machine for operating on shoes having, in combination, channeling and lip turning devices including a channel knife, a lip turning tool, a supporting member on which the knife and lip turning tool are carried pivoted to oscillate in a plane parallel to the shoe sole about an axis located toward the center of the shoe sole from the point of operation of the knife, means for imparting an oscillatory movement to the supporting member to oscillate the knife and lip turning tool in the line of feed, a shoe supporting jack, and automatically operating mechanism for imparting tipping, turning and feeding movements to the jack to maintain the shoe in operative position with relation to the knife, and to transfer the point of operation about the shoe.

25. A machine for operating on shoes having, in combination, shoe operating devices including a channel cutting knife, a positively driven feed roll arranged to engage with the edge of the shoe sole, a shoe supporting jack, and automatically operating mechanism for imparting tipping, turning and feeding movements to the jack to maintain the shoe in operative position with relation to the work operating devices and to transfer the point of operation about the shoe.

26. A machine for operating on shoes having, in combination, shoe operating devices including a channel cutting knife, a lip turning tool arranged to engage with and turn the channel lip, a positively driven feed roll arranged to engage with the edge of the shoe sole, a shoe supporting jack, automatically operating mechanism for imparting tipping, turning and feeding movements to the jack to maintain the shoe in operative position with relation to the work operating devices and to transfer the point of operation about the shoe.

27. A machine for operating on shoes having, in combination, channeling and lip turning devices including a channel knife arranged to reciprocate in the line of feed, a lip turning tool connected to oscillate with the knife in the line of feed and having a movement laterally of the channel lip to engage and turn over the lip, a shoe supporting jack, operating mechanism for imparting tipping, turning and feeding movements to the jack to maintain the shoe in operative position with relation to the channeling and lip turning devices and to transfer the point of operation about the shoe.

28. A machine for operating on shoes having, in combination, channeling and lip turning devices comprising a channeling knife, a lip turning tool arranged to engage with and turn the channel lip, a shoe supporting jack, pattern mechanism for imparting tipping, turning and feeding movements to the jack to maintain the shoe in operative position with relation to the channeling and lip turning devices and to transfer the point of operation about the shoe, and a guide engaging with the edge of the shoe sole controlled from said pattern mechanism to vary the position of the channel.

29. A machine for operating on shoes having, in combination, channeling and lip turning devices comprising a channeling knife, a lip turning tool arranged to engage with and turn the channel lip, a guide roll arranged to engage with the edge of the shoe sole, a work supporting jack, pattern mechanism, connections therefrom for automatically imparting tipping, turning and feeding movements to the jack to maintain the work in operative position with relation to the channeling and lip turning devices and to transfer the point of operation about the sole, and connections from said pattern mechanism for varying the position of the guide roll relatively to the knife to vary the position of the channel with relation to the sole edge.

30. A machine for operating on shoes having, in combination, channeling and lip turning devices including a channel knife, a lip turning tool arranged to engage with and turn the channel lip, a shoe supporting jack, automatically operating mechanism for imparting tipping, turning and feeding movements to the jack to maintain the shoe in operative position with relation to the channeling and lip turning devices and to transfer the point of operation about the shoe, and a feed roll engaging with the edge of the shoe sole positively rotated at a faster linear rate to prevent lag in the feeding movements of the jack.

EUGENE J. RAY.